Dec. 16, 1958  J. A. DRAKE  2,864,393
PRESSURE RATIO SENSER
Filed Aug. 31, 1953
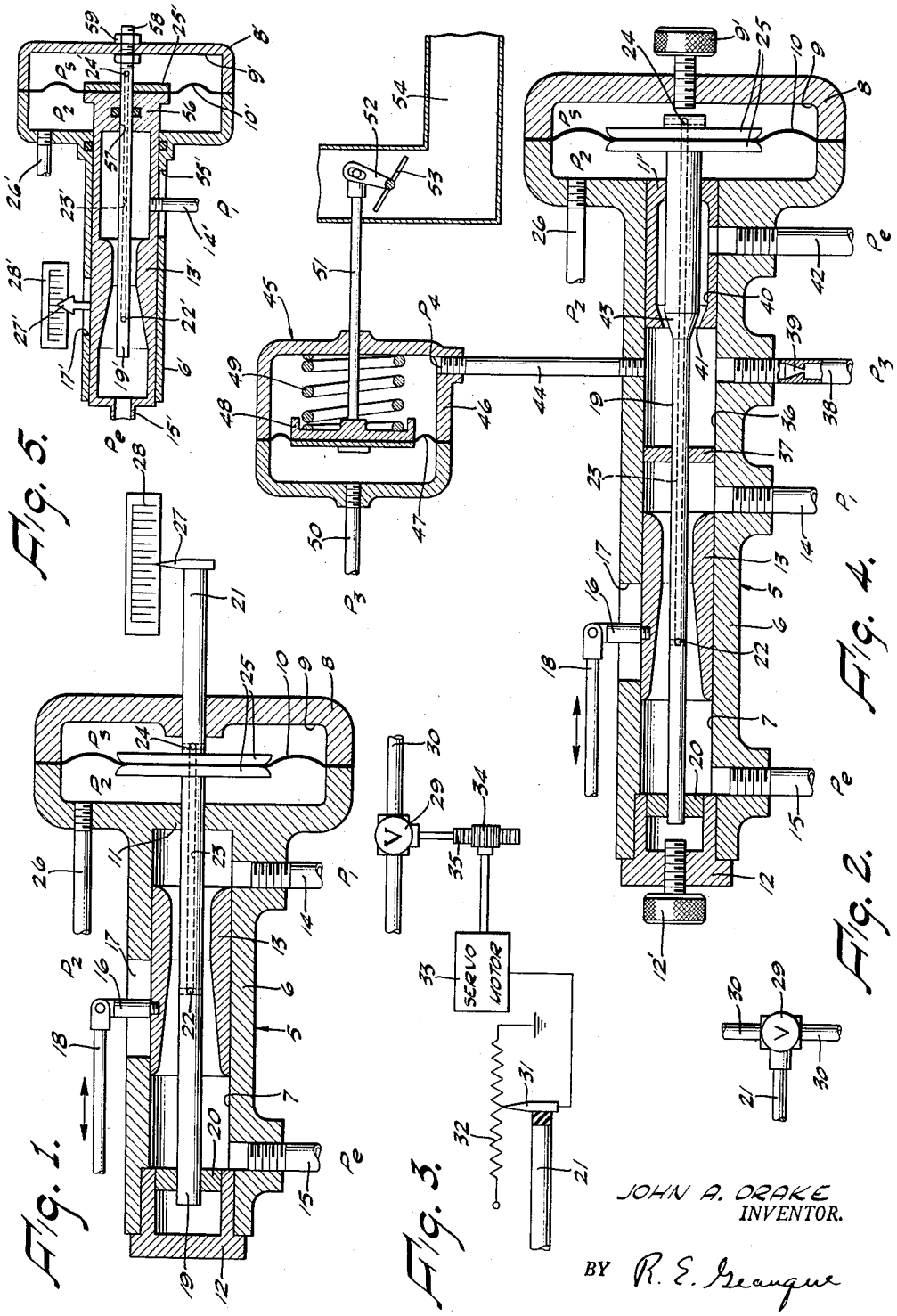
JOHN A. DRAKE
INVENTOR.
BY R. E. Granque
ATTORNEY

United States Patent Office 2,864,393
Patented Dec. 16, 1958

2,864,393
PRESSURE RATIO SENSER

John A. Drake, Van Nuys, Calif., assignor to Marquardt Aircraft Company, Van Nuys, Calif., a corporation of California Application August 31, 1953, Serial No. 377,397

3 Claims. (Cl. 137—82)

This invention relates to a pressure ratio senser and, more particularly, to a device for sensing the ratio of two pressures in order to indicate the ratio or to provide a continuous control system responsive to the ratio.

The invention makes use of the fact that the static pressure at a given station in a Venturi nozzle is related to the total pressure at the nozzle entrance as a unique function of the ratio of the area at the given station to the area at the nozzle throat. This unique function is obtained where there is a flow of a compressible fluid through the nozzle and the flow velocity at the throat is sonic. In the pressure ratio to be sensed, the numerator $P_1$ of the ratio is applied as the total pressure at the inlet of the Venturi nozzle and a fraction of this pressure, equal to the denominator pressure $P_2$ can be obtained from a static pressure pick-up along the length of the Venturi. Thus, the movement of the pick-up in the nozzle required to select a static pressure $P_s$ equal to the denominator pressure $P_2$ can be utilized to indicate the pressure ratio or to control any continuous process where the energy input to the process determines the resulting pressure ratio. For instance, the pressure ratio senser can be utilized to indicate or hold constant the flight Mach number of an aircraft when acting in conjunction with an engine fuel flow regulator, a drag brake, altitude control, or the like.

In the past, Venturi nozzles have been utilized as flow indicators by measuring the static pressure drop between the entrance and throat of the nozzle, but no use has been made of a static pressure pick-up along the length of a nozzle to sense pressure ratio. Previous devices for the control or measurement of Mach number have utilized various pressure ratios by first measuring each pressure of the ratio and then relying upon a complicated mechanical computing linkage to obtain the desired control or indication from the measured pressures. The present invention provides a much simpler device for accomplishing the same results as these prior devices, since no computing linkages are necessary or required.

One form of the present invention utilizes a diaphragm which receives the denominator pressure $P_2$ on one side and receives the pressure from the static pick-up on the other side, so that the diaphragm positions the pick-up at the station in the nozzle at which the static pressure $P_s$ is equal to the denominator pressure $P_2$. Since the position of the pick-up in the nozzle is an indication of the nozzle area ratio at which the ratio of total pressure $P_1$ to static pressure $P_s$ is equal to the ratio of $(P_1/P_2)$, this position is a unique function of the ratio $(P_1/P_2)$. By proper choice of a nozzle contour, the pick-up position can be made a linear or any other function of the pressure ratio. The position of the nozzle relative to the pick-up can be made adjustable to adjust the pressure ratio for control purposes or to calibrate a pressure ratio indicator. Also, instead of using the movement of the pick-up directly for control purposes, a pressure divider can be controlled by the pick-up to give a pressure differential which can be utilized as a power source for control purposes. In another form of the invention, the diaphragm moves the nozzle rather than the pick-up.

It is, therefore, an object of the present invention to provide a pressure ratio senser for continually determining the ratio between any two pressures by positioning a pick-up in a nozzle to obtain a static pressure from the higher pressure equal to the lower pressure.

A further object of the invention is to provide a means of sensing the ratio between two pressures by balancing one pressure against a fraction of the other pressure obtained from a pick-up within a nozzle.

A still further object of the invention is to provide a pressure ratio senser utilizing a static pressure pick-up movable within a nozzle receiving the higher pressure of the ratio and having sonic flow of a compressible fluid at the throat.

Another object of the invention is to provide a ratio indicator in which the position of the pick-up in a nozzle is an indication of the pressure ratio.

A further object is to provide a pressure ratio regulator in which the position of a pick-up in a nozzle is utilized to move a control element to maintain a constant pressure ratio.

These, and other objects of the invention not specifically enumerated above, will become readily apparent from the accompanying description and drawings, in which:

Figure 1 is a sectional view, partly in elevation, of the pressure ratio senser of this invention, showing the pick-up positioned within a Venturi nozzle and connected with an indicator.

Figure 2 is an elevational view of a modification of Figure 1, illustrating the manner in which the movement of the pick-up can be utilized in a control system to move a valve.

Figure 3 is an elevational view of a modification of Figure 1, illustrating the manner in which movement of the pick-up can be utilized in an electrical control system to move a valve.

Figure 4 is a sectional view of a modification, partly in section, showing the pick-up controlling an orifice area to obtain a differential pressure for activating the control element of a control system.

Figure 5 is a sectional view of a modification of Figure 1, wherein the pick-up is stationary and the nozzle is movable.

The embodiment of the invention illustrated in Figure 1 is formed of a casing 5 having a cylindrical member 6 forming a cavity 7 and an enlarged end section 8 surrounding the cavity 9. The diaphragm 10 is positioned within cavity 9 which is isolated from cavity 7 by partition 11. The open end of member 6 is closed by a plug 12 press-fitted, or otherwise securely retained, within the end opening.

A Venturi nozzle 13 is positioned within the cavity 7 between the entrance passage 14 and the exhaust passage 15, both of which passages connect with the cavity. While the nozzle can be securely held in any position, an arm 16 is shown positioned within a slit 17 in casing 5 and connected at one end to a lever 18 and threaded to the nozzle at the other end. Thus, movement of the lever 18 in either direction, as indicated by the arrows, will change the location of the nozzle for calibration purposes.

A pick-up 19 is centrally located longitudinally along the length of nozzle 13 and has one end slidably supported in a bearing member 20 contained in plug 12. The other end of the pick-up is slidably supported by partition 11 and end section 8 and has a portion 21 extending beyond section 8. A number of pick-up openings 22 are radially positioned in pick-up 19, and connect with a central passage 23 in a pick-up which leads to a second series of radial openings 24 communicating with one side of diaphragm 10. The central support members 25 for the diaphragm are secured to the pickup so that movement of the diaphragm 10 will cause movement of the pick-up 19 along the length of the nozzle. A passage 26 connects with the side of the diaphragm opposite the openings 24 and it is apparent that pressure in passage 26 will oppose the pressure communicated from the nozzle to the openings 24.

In operation, if it is desired to have the pressure ratio senser indicate the ratio between a pressure $P_1$ and some lower pressure $P_2$, the portion 21 is equipped with an indicator 27 which co-acts with scale 28 to give a reading of the ratio between the two pressures. To accomplish this result, the pressure $P_1$ is supplied to passage 14 and the pressure $P_2$ is supplied to passage 26. The sonic flow through nozzle 13, caused by the pressure difference between $P_1$ and $P_e$, will result in a variation in static pressure $P_s$ along the nozzle, since the value of $P_s$ at any station in the nozzle is a unique function of pressure $P_1$ and the ratio of the area of the nozzle at the station to the area of the nozzle at the throat. In other words, as the area of the divergent section of the nozzle becomes greater, the pressure $P_s$ decreases because of the character of the flow of a compressible fluid through the nozzle when the flow is sonic at the throat. Thus, by moving the openings 22 of pick-up 19 along the axis of the nozzle, the static pressure $P_s$ supplied through openings 24 can be varied. The nozzle 13 can exhaust to any pressure $P_e$ sufficiently lower than pressure $P_1$ to choke the nozzle by causing sonic velocity flow at its throat and, of course, the pressure $P_2$ could be utilized as the exhaust pressure, if low enough.

The diaphragm 10 serves to move both the pick-up 19 and the indicator 27 when a pressure unbalance exists between pressures $P_2$ and $P_s$. If pressure $P_2$ becomes greater than the static pressure $P_s$ sensed by pick-up 19, the diaphragm 10 will move to the right in Figure 1 until pick-up 19 senses a pressure $P_s$ equal to pressure $P_2$, at which time the movement of the diaphragm will stop and the diaphragm will remain in this position until there is a change in either pressure $P_1$ or $P_2$. If the pressure $P_2$ becomes less than pressure $P_s$, the diaphragm will move to the left in Figure 1 until the static pressure sensed by pick-up 19 again becomes equal to pressure $P_2$.

The position of the pick-up, when pressure $P_s$ equals pressure $P_2$, is an indication of the nozzle area ratio at which the ratio of total pressure $P_1$ to static pressure $P_s$ is equal to the ratio of pressure $P_1$ to pressure $P_2$. Therefore, this position is a unique function of this ratio $(P_1/P_2)$. By proper choice of a nozzle contour, the pick-up position can be made a linear or any other function of the pressure ratio, and by proper calibration of the scale 28, the pressure ratio may be read directly, since pointer 27 moves with diaphragm 10. Also, the nozzle position can be changed by lever 18 to calibrate the pressure reading. Instead of moving an indicator, the portion 21 can be directly connected to a valve 29, as shown in Fig. 2, in order to control the flow through conduit 30 in accordance with the ratio $(P_1/P_2)$. In Fig. 3, the portion 21 is shown controlling valve 29 in conduit 30 by positioning the wiper 31 on the winding 32 in order to control the amount and direction of rotation of servomotor 33. The motor drives a pinion 34 which moves rack 35 to adjust the valve 30. It is, therefore, apparent that the position of portion 21 can be utilized to indicate the ratio $(P_1/P_2)$ or to actuate any type of control element, either directly or through any type of servo mechanism.

It is understood that the pressures $P_1$ and $P_2$ can be any selected pressures of compressible fluids utilized in any system or process. The invention is particularly adapted for use as a flight Mach number indicator or as a control device responsive to flight Mach number. If the flight stagnation or total pressure $P_t$ at the nose of an aircraft is introduced to passage 14 as pressure $P_1$, and if the flight static or atmospheric pressure $P_0$ is introduced to passage 26 as pressure $P_2$, then the indicator 27 will read the ratio $(P_t/P_0)$, which ratio is a function of flight Mach number. Therefore, the scale 28 can be calibrated in terms of flight Mach number and the nozzle contour can be adjusted to make the position of the pickup any desired function of flight Mach number. Likewise, the pick-up position can be utilized to control any system in accordance with flight Mach number. Since the velocity of an aircraft is a function of flight Mach number and total temperature $T_0$ of the air, the movement of the pick-up can be utilized in a computing system to give air speed.

In the modification shown in Fig. 4, the movement of the pick-up is utilized to control a pressure divider device such as disclosed in United States Patent No. 2,645,240, entitled "Pressure Control Device," dated July 14, 1953 to John A. Drake. In this modification, like numerals refer to like parts as in the previous embodiment. The cylindrical member 6, forming cavity 7, contains the nozzle 13 with the pick-up 19 movable within the nozzle in order to balance the pressure $P_s$ against the pressure $P_2$. The pressure $P_1$ is introduced to the nozzle through passage 14 and the nozzle exhaust through passage 15, as in the previous modification. However, the member 6 is extended to form a second cavity 36 between the partition 37 and partition 11', both of which have a central, fluid-tight opening, to permit movement of the pick-up 19. A passage 38 introduces the regulated supply pressure $P_3$ into cavity 36 through a nozzle or restriction 39 in the passage. The partition 11' has a passage 40 with a nozzle or restriction 41 at one end and the passage 40 communicates with a passage 42 leading to exhaust pressure $P_e$. The pick-up 19 is enlarged within the passage 40 to form a contoured section 43 in position to vary the area of the nozzle 40 upon movement of the pick-up. Adjustable stops 9' and 12' are positioned at each end of pick-up 19 to limit the movement thereof.

The nozzles 39 and 41 form the two nozzles or restrictions of a pressure divider device as disclosed in the previously mentioned patent. The exhaust pressure $P_e$ is sufficiently less than the supply pressure $P_3$ in order to choke both of the nozzles. A passage 44 opens into cavity 36 at a fixed position between the two nozzles, and because of the type of flow through the nozzles, the ratio of the pressure $P_3$ to the pressure $P_4$ in passage 44 is a constant for any given ratio of the area $A_2$ of nozzle 41 to the area $A_1$ of nozzle 39. Also, the pressure $P_4$ will vary as $P_3 (A_1/A_2)$ so that the pressure $P_4$ will be some fraction of pressure $P_3$ as determined by the ratio of the areas of the nozzles.

The passage 44 connects with a constant pressure differential regulator 45 which is composed of a casing 46 divided by a diaphragm 47 into two separate spaces. A rigid member 48 is secured to the diaphragm 47 and a spring 49 is positioned between casing 46 and member 48 to supply a spring constant for the regulator. The pressure $P_4$ is applied to the spring side of the regulator while the pressure $P_3$ is applied to the opposite side through passage 50. An arm 51 is secured to member 48 and passes through casing 46 to move link 52 connected with valve 53 in passage 54.

The regulator 45 will be responsive to the actual pressure ratio existing between pressures $P_1$ and $P_2$ since the regulator is responsive to the supply pressure $P_3$ and a fraction of this pressure determined by the pressure ratio. The diaphragm 10 will move in response to the actual pressure ratio $(P_1/P_2)$ and the contour 43 will vary the area $A_2$ of nozzle 41 in response to this actual ratio $(P_1/P_2)$ to vary the pressure $P_4$ in proportion to the area $A_2$. Any change in the pressure $P_4$ will cause movement of valve 53 which will in turn adjust the flow through passage 54 to correct the pressure ratio $(P_1/P_2)$ to a selected value. Since the pressure $P_4$ is a function of the ratio $(P_1/P_2)$, and desired value of the ratio $(P_1/P_2)$ can be selected and the differential regulator 45 can maintain this selected ratio. It is understood that the valve 53 will control the flow to any process or system in such a manner as to correct the actual pressure ratio $(P_1/P_2)$ to the selected value. The pressures $P_1$ and $P_2$ can be taken as any two pressures within the process or system which are responsive to flow in passage 54. The pressure $P_3$ can be taken as a regulated pressure supply and, where desirable, the pressure $P_1$ could be also utilized as the pressure $P_3$ for control purposes. It is understood that the position of nozzle 13 can be adjusted by arm 18 in order to adjust the device for different selected pressure ratios.

This modification of the invention can be utilized as an aircraft Mach number control device. Since flight Mach number is a unique function of the ratio of free stream stagnation or total pressure $P_t$ at the aircraft nose to free stream static pressure $P_0$, it is possible to preselect a ratio of these pressures to be held constant and, thereby, hold the corresponding flight Mach number constant. In such case, the pressure $P_t$ would be introduced to passage 14 as the pressure $P_1$ and the pressure $P_0$ would be introduced to the passage 26 as pressure $P_2$. The diaphragm 10 will position contoured section 43 in order to adjust the pressure $P_4$ and to position the valve 53 in accordance with the actual pressure ratio $(P_t/P_0)$. Thus, the regulator 45 will serve to move the valve 53 to maintain the pressure ratio constant at the selected value. In this case, the passage 54 can be the fuel line to the engine of an aircraft and the fuel flow will vary the pressure $P_t$ to maintain the selected pressure ratio. However, the arm 51 can adjust any means which controls the speed of the aircraft.

Another modification of the invention is shown in Figure 5, which is similar to that illustrated in Figure 1, except that the Venturi nozzle is movable rather than the pick-up. The nozzle 13' is slidably mounted in casing 6', which has a slit 17' for allowing movement of indicator 27' relative to the casing, and a slit 55 to permit movement of inlet passage 14' relative to the casing. An exhaust passage 15' is secured at the exhaust end of the nozzle and the passage can be made flexible to compensate for movement of the nozzle. The indicator 27' cooperates with a scale 28' which serves the same purpose as scale 28 of Figure 1 and, obviously, the indicator 27' can be connected with a control valve or other devices in the same manner as discussed in connection with portion 21 of Figure 1.

The casing 6' has an enlarged end section 8' surrounding a cavity 9' which contains a diaphragm 10'. The inlet end of the nozzle is closed by an end portion 56 which is rigidly secured to diaphragm 10' by support member 25'. Also, the end portion 56 has a central opening 57 for slidably receiving a pick-up 19' centrally located within the nozzle. The end 58 of the pick-up extends through section 8' and is threaded to receive a lock-nut 59 which serves to lock the pick-up in any desired position relative to the nozzle. A number of pick-up openings 22' are radially positioned in pick-up 19' and connect with a central passage 23' leading to a second series of radial openings 24' communicating with one side of diaphragm 10'. A passage 26' connects with the side of the diaphragm opposite the openings 24' and it is apparent that pressure in passage 26' will oppose the pressure communicated from the nozzle to openings 24'. The opening in section 8' which slidably receives portion 56 and the opening 57 which slidably receives the pick-up, both contain a pressure seal in order to prevent leakage from the side of the diaphragm connected to passage 26'.

In operation, the pressure $P_1$ is supplied to passage 14' and the pressure $P_2$ is supplied to passage 26'. The sonic flow through the throat of nozzle 13', caused by the pressure difference between pressure $P_1$ and the exhaust pressure $P_e$, will result in a variation in static pressure $P_s$ along the nozzle 13', as previously described, and the nozzle 13' will be moved by the diaphragm 10' relative to the pick-up, until the pressure $P_s$ communicated to openings 24' is equal to the pressure $P_2$. Thus, the position of the nozzle will provide a measure of the pressure ratio $(P_1/P_2)$ and the position of the pick-up 19' can be varied for purposes of calibration. It is apparent that this modification can be used for the same purposes and is equivalent to that shown in Figure 1; the only difference being that the nozzle is moved relative to the pick-up in order to balance the pressure $P_s$ against the pressure $P_2$, instead of the pick-up moving relative to the nozzle.

By the present invention, a pressure ratio sensor is provided which makes use of the static pressure distribution in a Venturi nozzle having sonic flow of a compressible fluid at the throat of the nozzle. The device is sensitive to the pressure ratio only and not to the pressure levels and can be utilized to either measure any pressure ratio or to control any system or process in accordance with the measured pressure ratio. Also, the pressure ratio senser can be utilized to maintain a selected pressure ratio by controlling a constant pressure differential regulator for any process or system, it being understood that other means than those illustrated can be utilized to activate the pressure differential regulator in response to pressure ratio. Various other modifications are contemplated and may be obviously resorted to by those skilled in the art without departing from the spirit and scope of the invention as defined in the appended claims.

What is claimed is:

1. A device for sensing the ratio between two compressible fluid pressures comprising a convergent-divergent nozzle receiving the higher of said two pressures and discharging to the other of said pressures to cause sonic velocity flow at the throat of the nozzle, diaphragm means for receiving the other of said pressures on one side thereof, a pick-up positioned within said nozzle and having a static pressure opening, means for limiting the location of said static opening of said pick-up to positions within the divergent section of said nozzle, means for connecting said opening with the other side of said diaphragm means, said pick-up and said nozzle being supported for relative movement therebetween in response to movement of said diaphragm means so that said opening can be positioned along the divergent section of said nozzle to receive a static pressure which balances said other pressure.

2. A device for sensing flight Mach number of a movable craft, comprising a converging-diverging nozzle, means for connecting the entrance of said nozzle with the flight total pressure, means for connecting the discharge end of said nozzle with the flight static pressure, said craft moving at high enough speeds to develop a differential between said two pressures sufficient to cause sonic velocity flow at the throat of said nozzle, diaphragm means located within a casing, means for connecting the flight static pressure with one side of said diaphragm means, a pick-up positioned within said nozzle and having a static pressure opening, means for limiting the location of said static opening of said pick-up to positions within the divergent section of said nozzle, means for connecting said opening with the other side of said diaphragm means, said pick-up and said nozzle being supported for relative movement therebetween in response to movement of said diaphragm means so that said opening can be positioned along the divergent section of said nozzle to receive a static pressure which balances said flight static pressure, the balancing position of said opening being a function of flight Mach number.

3. In a control device having an output proportioned to the ratio between two compressible fluid pressures, a convergent-divergent nozzle receiving the higher of said two pressures and having sonic flow at its throat, a pick-up positioned within said nozzle and having a static pressure opening, means for limiting the location of said static opening of said pick-up to positions within the divergent section of said nozzle, diaphragm means for receiving the other of said two pressures on one side thereof, means for connecting said opening with the other side of said diaphragm means, said pick-up being connected to said diaphragm means for movement of said opening along said nozzle to a position where the static pressure sensed by said opening balances said other pressures, and means for modifying a supply pressure to obtain a regulating pressure proportional to the position of said pick-up and to the ratio of said two pressures, said modifying means comprising two restrictions spaced apart in a passage, said supply pressure being introduced to said passage and each restriction having sonic flow at its throat, means connected with said pick-up for varying the throat area of one of said restrictions, and means connected with said passage at a location intermediate said restrictions for receiving said regulating pressure.

References Cited in the file of this patent

UNITED STATES PATENTS

| | | |
|---|---|---|
| 2,223,712 | Ziebolz | Dec. 3, 1940 |
| 2,512,790 | Cleveland | June 27, 1950 |
| 2,592,176 | Orlin et al. | Apr. 8, 1952 |
| 2,592,569 | Henderson | Apr. 15, 1952 |
| 2,629,569 | Andrews | Feb. 24, 1953 |
| 2,671,620 | Andrews | Mar. 9, 1954 |